United States Patent Office 3,318,826
Patented May 9, 1967

3,318,826
MOLDED PLASTIC ARTICLE CONTAINING POLYMER GRAFTED FILLER OR REINFORCEMENT
Douglas J. Bridgeford, Danville, Ill., assignor to Tee-Pak, Inc., Chicago, Ill., a corporation of Illinois
No Drawing. Filed Feb. 27, 1963, Ser. No. 261,525
21 Claims. (Cl. 260—17.4)

This application is a continuation-in-part of my prior co-pending application Serial No. 718,995, now U.S. Patent 3,083,118.

This invention relates to new and useful improvements in shaped plastic articles of manufacture and more particularly to cast or molded plastic articles containing a filler or reinforcement material producing improved physical properties in the composite article.

In the preparation of shaped plastic articles of manufacture, from five to ten or more different items may enter into the mixture which forms the final product. The binder or plastic matrix is usually the most important ingredient. Other ingredients include fillers or reinforcements, catalysts, plasticizers, solvents, extenders, stabilizers, lubricants, hardeners, antioxidants, and coloring agents. Filler or reinforcement materials are used in plastic compositions (1) to reduce the cost of the resulting product by replacing part of the more expensive plastic matrix with cheaper filling materials, and (2) to modify, improve, or introduce properties into the product which are not obtainable by the plastic matrix alone.

Filler and reinforcement materials are used in extending and modifying the properties of thermosetting and thermoplastic resins. Materials which have been used for this purpose include a large variety of organic and inorganic materials in powdered or fibrous form. Inorganic fillers and reinforcement materials include powdered materials such as clays, diatomaceous earth, chalk, barium sulfate, litharge, etc. Inorganic mineral fillers have also been used in the form of thin sheets or flakes, e.g. mica, and fibers, e.g. asbestos, glass fibers, etc. Organic filler and reinforcement materials which are used for extending and modifying various plastics include powdered or particulate materials such as wood or other cellulosic flours; protein meals, e.g. soybean meal; graphite; carbon black, etc. Fibers including cellulosic fibers such as cotton, alpha-cellulose, sisal fiber, etc., and synthetic fibers such as nylon, viscose rayon, acetate, rayon, etc., have also been used as fillers and reinforcements.

A critical examination of all known commercially used filler and reinforcement materials will show that none is satisfactory in meeting all of the many desired properties of an ideal filler material. However, wood flour and fibrous cellulosic materials meet many of the requirements and are most widely used in phenolic molding compounds. Glass fibers, while expensive, have been extensively used in filling and reinforcing thermoplastic resins and polyester casting or molding resins. Cellulosic filler materials, whether powdered or fibrous, are generally subject to the objection that products using such fillers have relatively poor weathering and moisture resistant properties. Practically all fillers which have been used commercially are objectionable in some particular, and filler materials are, therefore, selected with special consideration for the use of the product article.

It is, therefore, one object of this invention to provide new and improved shaped plastic articles of manufacture utilizing improved filler materials which are free from many of the objections to the use of such materials in compositions heretofore made.

Another object of this invention is to provide a new and improved shaped plastic article of manufacture utilizing a thermoplastic or thermosetting matrix and a chemically modified filler or reinforcement material providing improved physical properties in the resulting product.

Still another object of this invention is to provide a new and improved shaped plastic article of manufacture comprising a thermoplastic or thermosetting matrix containing a filler or reinforcement material of a particulate or fibrous form which has been chemically modified to provide superior impact strength, dimensional stability, weather resistance, and/or moisture regain properties.

A feature of this invention is the provision of a new and improved shaped plastic article of manufacture comprising a plastic matrix containing a filler or reinforcement material having deposited in situ a polymer of an olefinically unsaturated monomer.

Another feature of this invention is the provision of a new and improved plastic article of manufacture formed by a casting or molding process and comprising a plastic matrix containing a filler or reinforcement material having a polymer of an olefinically unsaturated monomer deposited in situ therein and at least partially grafted to the filler material.

Still another feature of this invention is the provision of a new and improved shaped plastic article of manufacture, the base material of which comprises a thermosetting or thermoplastic matrix containing a fibrous cellulosic material having deposited in situ a polymer of an olefinically unsaturated monomer.

Other objects and features of this invention will become apparent from time to time throughout the specification and claims as hereinafter related.

*Summary of the invention*

This invention is based upon my discovery that shaped plastic articles of manufacture can be prepared having substantially improved physical properties by incorporating a filler or reinforcement material, having deposited in situ a polymer of an olefinically unsaturated monomer, into a thermoplastic or thermosetting matrix. This invention is primarily concerned with novel plastic articles of manufacture containing filler or reinforcement materials in either particulate, sheet, or fibrous form which have been chemically modified by deposition in situ of a polymer of an olefinically unsaturated monomer.

The chemically modified filler or reinforcement materials utilized in this invention are preferably fibrous cellulosic materials having a polymer of an olefinically unsaturated monomer deposited in situ and at least partially grafted thereto by the process described in my co-pending application, Serial No. 718,995. While those compositions are preferred, for a variety of reasons, I have also found that plastic articles having substantially improved physical properties can be prepared using other polymer deposition and/or polymer grafting techniques and using other particulate or fibrous filler or reinforcement materials.

In carrying out this invention, any of the well known filler and reinforcement materials can be chemically modified by deposition of a polymer therein and incorporation of the resulting product into a plastic matrix to obtain a product having superior physical properties. Examples of filler and reinforcement materials include, but are not limited to, the following:

*Inorganic (mineral) fillers*

Clay, bentonite, attapulgite, chalk, litharge, barium sulfate, mica, diatomaceous earth, glass fibers, asbestos, etc.

*Organic Fillers*

Particulate material such as graphite, carbon black, wood flour, soybean meal, keratin (e.g. ground feathers), and fibrous organic materials such as cotton flock, rayon, nylon, synthetic organic fibers, alpha-cellulose, hemp, sisal, chopped paper, paper pulp, and macerated fabric. The filler or reinforcement material is preferably treated in accordance with my copending application, Serial No. 718,995. In the process described in that patent application, the filler material is treated with an ionic catalyst material (preferably a component of a redox catalyst system) to deposit a catalyst ion in the filler material by ion exchange reaction. The catalyst-containing material is then treated with an olefinically unsaturated monomer, either alone or in solution, and anything additional required to activate the catalyst to initiate polymerization of the monomer within and upon the filler material. In some cases, the catalyst which is deposited by ion exchange reaction is sufficient to initiate polymerization without additional chemical activation. In some cases, a second catalyst or promoter component is added with the monomer to initiate polymerization throughout the body of the filler material.

Any of the catalyst systems or monomers described in my copending application can be used in modifying fillers or reinforcement materials for incorporation into plastic compositions in accordance with the present invention. When filler or reinforcement materials are treated with catalyst system and monomers as described in my aforementioned copending application, a deposition of polymer and partial grafting of polymer (in most host materials) occurs in the treated material. The polymer is distributed very uniformly throughout the body of the filler or reinforcement material and/or on the surface thereof with the result that plastic compositions incorporating the modified filler or reinforcement have substantially improved physical properties. Polymers can be deposited and/or grafted to filler or reinforcement materials for use in plastic compositions in accordance with this invention using other polymer deposition or grafting techniques such as those discussed in Block and Graft Polymers, W. J. Burlant and A. S. Hoffman, Reinhold Publishing Corporation, 1960. When a polymer is deposited within a filler or reinforcement material (and at least partially grafted thereto), the modified material has substantially different properties from materials which have merely been impregnated with a polymer. The deposited (or grafted) polymer is chemically bound to the host material and provides a surface which is more compatible with the plastic matrix in which it is used as a filler or reinforcement.

The following non-limiting examples are illustrative of the scope of this invention.

*Example 1*

A series of experiments were carried out in which polyethylene was reinforced using polymer-modified fibers as the reinforcing material.

The deposition of polymer into fibers was carried out in accordance with the process described in my copending application, Serial No. 718,995.

In one experiment, 968 g. (dry weight) of second cut cotton linters was modified by deposition of poly(butylacrylate) therein. The cotton linters were soaked in a 0.1% aqueous solution of ferrous ammonium sulfate and washed with deionized water. This treatment deposits ferrous ion by ion exchange reaction with the cellulosic fibers. The treated cotton fibers were then placed in an aqueous solution of butyl acrylate containing 0.03% hydrogen peroxide and allowed to stand overnight at room temperature. The butyl acrylate was completely consumed in this reaction with the polymerization taking place entirely within and upon the surface of the cotton fibers. There was no formation of latex and no residual monomer odor. The cotton fibers were then dried and weighed. The poly(butylacrylate) deposited within the fibers was found to be 28% based on the dry weight of cotton fibers treated.

Several portions of polymer-treated cotton fibers were mixed with polyethylene to form compositions containing 40–60% wt. reinforcing fiber and the remainder polyethylene plastic matrix. These compositions were formed into sheets in a press at 110° C. and pressure of 200 p.s.i. for fifteen seconds. The molded, reinforced sheets were compared with controls containing no reinforcement and controls containing unmodified cotton fibers. The molded plastic sheets containing polymer-modified cotton fibers had tensile strengths 28% greater than controls containing unmodified cotton fibers and 40% greater than molded polyethylene sheets containing no reinforcing fibers. Similar comparisons were made for impact strength, dimensional stability, and moisture regain. The polyethylene sheets reinforced with polymer-modified cotton fibers were superior in impact strength and dimensional stability to both controls and were superior in moisture regain properties (absorbed less moisture) when compared to the polyethylene reinforced with unmodified cotton fibers.

*Example 2*

A series of experiments were carried out in which cotton linters and wood pulp were modified by deposition of poly(methylmethacrylate) therein and the resulting product incorporated in a poly(methylmethacrylate) matrix.

In one experiment, 650 g. (dry weight) of second cut cotton linters were slurried with an aqueous solution of hydrazine hydrate (25 ml. in distilled water) to bind hydrazinium ion to the cotton by ion exchange. The treated cotton was then washed with distilled water and placed in an aqueous solution of methyl methacrylate containing 0.03% hydrogen peroxide. The mixture was heated to 70° C. for two hours and allowed to stand overnight at 45° C.

In this reation, the methyl methacrylate was almost entirely consumed with substantially no latex formation. Poly(methylmethacrylate) was deposited throughout and upon the cotton fibers in an amount of 30% based on the weight of dry fiber.

Another experiment was carried out using the procedure just described in which Cordenier wood pulp was substituted for the cotton linters, and the product obtained contained 39% wt. poly(methylmethacrylate) based on the dry weight of the pulp.

The polymer-modified cotton linters and polymer-modified wood pulp obtained in the foregoing experiments were used as reinforcement materials in poly(methylmethacrylate) compositions. Small portions of the polymer-modified cotton and polymer-modified wood pulp were mixed with a 10% solution of poly(methylmethacrylate) in ethyl acetate and the solvent removed under vacuum. The resulting compositions were then formed under heat and pressure into reinforced sheets containing 50–60% wt. reinforcing fiber.

A comparison of physical properties of the polymer-modified fiber-reinforced plastic sheets with controls shows that the compositions obtained are superior in impact strength, dimensional stability, resistance to weathering, and moisture regain.

*Example 3*

Wood pulp containing 30% wt. deposited poly(methylacrylate) is mixed with poly(methylmethacrylate) molding powder to produce a molding composition containing 20% wt. reinforcing fiber. The mixture is fed to a commercial injection molding machine where it is fused and introduced under pressure into mold cavities having the configuration of tool handles. The molded products which are obtained have high impact strength, dimensional stability, resistance to weathering, and extremely low moisture absorption.

In forming shaped articles of manufacture from compositions of the type described throughout this specification, the proportion of reinforcing material in the plastic matrix is not critical but is selected to give optimum properties for a given purpose. The proportion of polymer-modified fiber used as a reinforcing material in a plastic matrix can vary from as little as a fraction of 1% up to 80% or more by weight of the finished product. Compositions containing a low proportion of reinforcing or filler material are more readily handled in injection, extrusion, or compression molding equipment. Compositions containing a high proportion of reinforcing material are best handled in laminating type presses.

Example 4

About 40% wt. polystyrene is deposited into a softwood flour for use as a filler with thermosetting resins. The polymer deposition is carried out using a hydrazine hydrate-hydrogen peroxide catalyst system as described in my copending patent application. The polymer-modified wood flour (derived from pine wood) is mixed with a variety of thermosetting resins to prepare molding compositions which are subsequently molded by standard compression molding or transfer molding equipment. The polymer-modified wood flour is compounded with phenol-formaldehyde molding compositions, urea-formaldehyde, and melamine-formaldehyde molding compositions. The polymer-modified wood flour is especially useful in urea-formaldehyde and melamine-formaldehyde compositions where light colored products are desired.

The molded plastic articles which are produced from the compositions just described have high impact strength, low moisture absorption, high dimensional stability (including very low mold shrinkage), and excellent weather resistance.

Example 5

Bleached sisal fibers containing 4.45% moisture and 1.2% water extractible materials were treated with methyl methacrylate in accordance with my copending patent application to deposit poly(methylmethacrylate) therein. A 1.003 g. (bone dry weight) portion of the sisal fibers was dispersed into 10 liters of water and then placed in 15 liters of 0.10% ferrous ammonium sulfate solution and stirred occasionally for twenty minutes. This treatment is effective to deposit ferrous ion by ion exchange reaction. The fibers were then washed twice in deaerated distilled water and then placed in 25 liters of distilled water contained in a stainless steel reactor. About 320 ml. of deinhibited methyl methacrylate monomer was added to the reactor and the polymerization reaction started by addition of sufficient hydrogen peroxide to produce a concentration of 0.005%.

The temperature of the reaction mixture was increased slowly over a one-hour period to 70° C. and held at that temperature for four hours. The reactor was shaken to distribute the monomer in the aqueous phase continuously during the deposition period. The pH of the aqueous solution in the reactor was approximately 5.2 at the end of the reaction. When the polymer-modified sisal fibers were removed, dried, and weighed, it was found that 22% addon of poly(methylmethacrylate) had occurred.

When the dried polymer-modified sisal fibers were placed upon distilled water, the fibers floated for over two hours even when they were stirred frequently. When the untreated sisal fibers used as starting material were placed upon the surface of water, the fibers wet out in about two minutes and sank to the bottom of the container.

When the polymer-modified sisal fibers are mixed with a polycarbonate molding resin, a composition is obtained suitable for extrusion to produce hollow pipe. When the composition is extruded to form such pipe, the product has high impact strength, high dimensional stability, and very low water absorption.

Example 6

Cotton fibers were treated with butyl acrylate monomer using a ferrous-hydrogen peroxide catalyst system as previously described. As a result of this treatment, 28% poly(butylacrylate) was deposited within the fibers. The polymer-modified fibers were then formed into 12" x 12" hand sheets of paper of 100 lbs./rm. wt.

The hand sheets of polymer-modified paper which were produced above were sized with melamine-formaldehyde resin, and saturated with a commercial phenolic molding resin. The treated sheets were then stacked to form a five-sheet laminate and compressed in a commercial laminating press.

The laminates which were prepared as described were of XXXP NEMA grade. These laminates had high tensile and impact strengths, very low water absorption, and excellent electrical properties, suitable for electrical insulation and supporting panels for electrical equipment.

Example 7

A commercial phenolic catsing resin is mixed with 40% wt. of polymer-modified wood flour produced as described in Example 4. The mixture is agitated to assure complete dispersion and an acid catalyst added to initiate the condensation reaction. The casting composition is placed in an open mold and a large slab of cast resin obtained after about a two-hour reaction time. The polymer-modified wood fiber can also be mixed with casting resins to produce compositions suitable for casting in hollow rubber molds to produce articles of intricate shape and design. As in the case of molded phenolics, the products obtained from these casting compositions have high impact strength, dimensional stability, weather resistance, and extremely low moisture absorption. The polymer-modified wood flour can also be used as a filler for other casting resins including polyesters, acrylics, and epoxy resins.

Example 8

Chopped paper is soaked in a dilute solution of chrome alum, washed, and treated with aqueous solution of acrylonitrile containing 0.02% hydrogen peroxide. The reaction is carried out for a period of six hours at 50° C. with addition of $H_2O_2$ and produces a 30–50% addon of polyacrylonitrile. The polymer-modified paper particles are then mixed in a 1:3 wt. ratio with polyvinyl chloride and molded by standard compression molding techniques into a corrugated sheet suitable for structural uses, e.g. awnings or patio covers.

Example 9

Keratin, in the form of ground feathers, is treated with 0.8% aqueous persulfuric acid at 50° C. for ten minutes. The keratin is then washed three times with deionized water and heated for thirty minutes at 50° C. with a solution of 5% acrylonitrile containing 0.3 g. of ferrous ammonium sulfate. At the end of this reaction period, the keratin contains a polymer addon of about 10% polyacrylonitrile.

The polymer-modified keratin is then mixed with a commercial urea-formaldehyde molding composition and high impact strength, moisture resistant products are molded therefrom.

Example 10

Experiments were carried out in which polymers were deposited onto glass fibers. The glass fiber used was a type 182 sateen weave glass reinforcing cloth made specifically for reinforcement of plastics. The original glass fiber had been sized with an oil-starch emulsion as shown by iodine staining and microscopic observation. The sized glass fiber was desized in a conventional manner using detergents and with acid hydrolysis of the starch size. Microscopic observation of the glass fibers after the de-sizing process indicated that they were clean.

The glass fabric was cut into 1 cm. squares and placed in glass reactors for ion exchange reaction. About 20 g. of glass fiber was used for each ion exchange experiment. The glass fabric was pre-treated with pH 11 aqueous sodium hydroxide for one day prior to the experiments. The ion exchange was conducted using a copper-ammonia complex at 0.01 molar concentration and a silver-ammonia complex at 0.01 molar concentration. The complex solutions were passed through columns of treated glass fabric at the rate of 10–15 ml./min. One liter of each of the solutions was passed through the glass column and the column then washed with 500 ml. of pH 11 aqueous sodium hydroxide. The ammonia complexes were at the same pH for the exchange reaction. The copper-treated glass became slightly greenish and the silver-treated glass slightly gray as the result of this treatment. The copper and silver cations were then eluted from the glass using 0.5 N nitric acid. The eluates were then concentrated and analyzed by conventional means. Both the silver and the copper cations were found to have exchanged onto the glass in amounts corresponding to 0.0035 m. eq./g. of glass. This amount of ion exchange is quite adequate for the use of the two cations as catalysts or components of initiator systems when bound to the glass surface.

In one experiment, 3.3273 g. of sateen glass fabric was placed in 300 ml. of deaerated distilled water containing 1 ml. of 85% hydrazine hydrate. The pH of the mixture was 10.2. The glass was left for about three minutes in this mixture and then washed once with 200 ml. of pH 11 aqueous sodium hydroxide. The glass was then removed and placed in a mixture of 300 ml. water and 25 ml. of methyl methacrylate at approximately 100° C. Thirty seconds later, 10 ml. of 0.3% hydrogen peroxide were added and the solution was refluxed for about thirty minutes. The heat was shut off, and the solution and glass fabric were allowed to stand for eighteen hours. The glass fabric was then removed and was found to be coated with a layer of polymer. The monomer solution was at a pH of 5. When the glass fabric was dried under vacuum at 90° C. for two hours, it was found to weigh 3.4548 g. The deposition resulted in a 3.8% addon of poly(methylmethacrylate).

The polymer-coated fibers are mixed with polyvinyl chloride and laminated to form panels having high impact strength.

The polymer-coated glass fibers can also be cut into short lengths and used in admixture with thermoplastic and/or thermosetting compositions, e.g. polyvinyl chloride, poly(methylmethacrylate), polyesters, phenol-formaldehyde, urea-formaldehyde, melamine - formaldehyde, etc., resins, for injection, compression, transfer, or extrusion molding.

*Example 11*

In a series of experiments, polymers were deposited into clays for use as reinforcements or fillers for plastics. The clays used were both calcined and non-calcined Kaolin and Wollastonite.

Twenty grams of the respective clays were treated with 0.10% ferrous ammonium sulfate solution to bind ferrous ion by ion exchange reaction. The treated clays were then each mixed with 1-liter portions of hot water containing 20 ml. of deinhibited styrene monomer and 0.003% hydrogen peroxide. After a reflux period of about one and one-half hours, the reaction was stopped and the clays were found to have polymer addons of about 90% wt.

The organophilic nature of the polymer-modified clays was tested by flotation experiments on toluene and carbon tetrachloride. The unmodified clays were not wet out or wet by the two organic solvents where as the polystyrene-modified clays were wet out by both the toluene and carbon tetrachloride.

When the polystyrene-modified clays are mixed in amounts ranging from about 10–50% wt. with polystyrene molding powder and injection molded, the articles which are produced thereby are found to have high impact strength, dimensional stability, and low moisture absorption.

*Example 12*

Asbestos fibers are soaked in a dilute solution of chromous ion as described in my copending patent application, washed, and placed in a 2% aqueous solution of styrene containing 0.01% hydrogen peroxide. The mixture is heated at 60° C. for about five hours. At the end of this reaction time, the asbestos fibers have about 10–20% wt. polystyrene deposited within the fibers and coated on the surface of the fibers.

The polystyrene-modified asbestos fibers are mixed with a phenolic molding powder and used in the molding of high impact strength, electrical motor housings.

*Example 13*

Mica flakes are soaked in a dilute aqueous solution of chromous ion, washed, and then placed in an aqueous solution of styrene containing 0.02% wt. hydrogen peroxide. The mixture is heated for six hours at 60° C. At the end of this reaction time, the mica flakes are coated with 20–50% wt. polystyrene.

The polystyrene-modified mica flakes are mixed with a ureaformaldehyde molding resin (about 20% wt. of mica) and molded into sheets having excellent electrical insulating properties and a novel decorative effect.

*Example 14*

A series of experiments were carried out in which cellulosic fibers were modified by deposition of varying amounts of poly(methylmethacrylate) and incorporated in admixture with glass fibers in various reinforced plastic compositions.

Kraft wood pulp was soaked in 0.2% ferrous ion solution (ferrous ammonium sulfate), washed with distilled water several times, and then placed in a dilute aqueous solution containing methyl methacrylate and 0.003% hydrogen peroxide. The pulp was present in a slurry concentration of 0.4%, and the methyl methacrylate to pulp weight ratio was about 10:1. The mixture was heated very slowly to 100° C. and after five minutes at that temperature was allowed to cool. The treated pulp was washed in distilled water, dried, and weighed. As a result of this treatment, there was a uniform deposition of poly(methylmethacrylate) within the fibers and on the surface thereof. The amount of polymer addon was 324% based on the dry weight of the pulp treated.

In another experiment, kraft wood pulp was soaked for five minutes in an aqueous solution containing 0.15 g. hydrazine hydrate, and then washed three times in distilled water. The pulp was then added to an aqueous solution containing methyl methacrylate and 0.03% hydrogen peroxide. The pulp was present in the reaction mixture in a slurry concentration of 0.4%. The methyl methacrylate per pulp weight ratio was 5:1. The mixture was then heated at about 95° C. for sixty minutes and allowed to cool. The treated pulp was removed from the solution, dried, and weighed. There was a uniform deposition of poly(methylmethacrylate) within and upon the individual cellulosic fibers. The amount of polymer addon was 124% based on the weight of dry pulp treated.

In still another experiment, kraft wood pulp was treated with a dilute aqueous solution of hydrazine hydrate and placed into a monomer solution for further reaction without the intermediate washing step. The hydrazine hydrate-treated pulp was placed in an aqueous solution containing methyl methacrylate and 0.03% hydrogen peroxide. The methyl methacrylate per pulp weight ratio was 2.5:1 and the reaction was carried out for sixty minutes at 70° C. At the end of this reaction time, the pulp was removed from the solution, dried, and weighed. There was a uniform deposition of poly(methylmethacrylate) throughout and upon the wood fibers. The amount of polymer addon in this experiment was 40.7% based on the dry weight of the pulp treated.

A large number of additional experiments were carried out in which the reaction temperature, the slurry concentration, the monomer per pulp weight ratio, and the reaction time were varied. Under the various reaction conditions, the amount of poly(methylmethacrylate) deposited into cellulose fibers varied from 22–324% based on the dry weight of fibers treated.

*Example 15*

A series of experiments were carried out in which reinforced plastic panels were prepared using acrylic and polyester resins reinforced with a mixture of glass fibers and a cellulosic fiber having poly(methylmethacrylate) deposited therein prepared as described in Example 14. The reinforced panels were prepared on a Hydrolair press using chrome-plated, matched metal, flat sheet dies. When shaped parts of other configurations are desired, the molding operation is carried out using suitably designed dies. The glass fibers and cellulose fibers were mixed by forming a slurry of the fibers and collecting them in a layer or mat or a screen. The fiber mat was then dried and used in the preparation of reinforced plastic panels. The mixture (fiber mat) of reinforcing fibers was placed on the die, and the molding resin, together with the polymerization catalyst, was poured over the reinforcing material to form a filled panel about nine inches square. The dies containing the reinforcement and resin mixture are then placed in the press at the desired molding temperature (viz. 100–120° C.) and molded under a suitable molding pressure. The molding pressures used in the preparation of reinforced plastic parts vary somewhat in accordance with the properties desired in the finished product. Pressures of 100–200 p.s.i. are commonly used, and pressures up to 500 p.s.i. or higher can be used where a denser product is desired.

*Example 16*

Control panels were prepared in accordance with a procedure described in Example 15 using a reinforcing material comprising 80 parts by weight of glass fibers and 20 parts by weight of unmodified kraft wood pulp. The plastic matrix used was poly(methylmethacrylate). A mixture of Lucite 204–X acrylic sirup, 1% benzoyl peroxide catalyst, and 35% wt. of the control reinforcement was prepared and fabricated into flat panels as described in Example 15. The control panel which was thus produced had an Izod impact strength of 7.5 ft. lbs./in., a tensile strength of 10,600 p.s.i., and water absorption of 1.07% in twenty-four hours.

Another reinforcing composition was prepared by mixing 80 parts by weight of glass fibers with wood pulp prepared in accordance with Example 14 having a 63% addon of poly(methylmethacrylate), in an amount providing 20 parts by weight of cellulose. The reinforcing material containing deposited poly(methylmethacrylate) was mixed with Lucite 204–X acrylic molding sirup and benzoyl peroxide catalyst, as described above, in an amount providing 28.2% wt. of reinforcement. The mixture was then molded into panels under the same conditions used in the preparation of the control panel. The molded, reinforced product had a tensile strength of 9,200 p.s.i., Izod impact strength of 8.7 ft. lbs./in., and water absorption of 0.65% in twenty-four hours.

Several additional reinforcing compositions were prepared by mixing 80–95 parts of glass fibers with 5–20 parts of cellulose having poly(methylmethacrylate) deposited therein. The cellulose used in these compositions had polymer addons ranging from about 20–90% wt. based on dry weight of the cellulose. The mixture of glass fibers and poly(methylmethacrylate) modified cellulose was added to Lucite 204–X molding sirup in proportions ranging from about 25–35% wt. and molded as in the foregoing examples. In each case, the molded reinforced acrylic panels had tensile strengths approximately equal to controls, impact strengths equal to or greater than controls, and water absorptions which were about 50–60% of controls.

The various reinforced panels were subjected to accelerated weathering tests, and it was found that the panels containing polymer-modified cellulose showed little or no blooming or other adverse weathering effects after 500–2,000 hours of exposure. After a similar exposure time under accelerated weathering conditions, the control panels showed considerable blooming of cellulose fibers and slight blooming of glass fibers.

Additional tests were carried out in which fiber reinforced panels were immersed in water for periods up to about eight weeks and also exposed to steam for extended periods of time. In each case, the laminates containing untreated cellulose fibers exhibited moderate to heavy cellulose fiber blooming while the panels containing polymer-modified cellulose fibers exhibited little or no cellulose fiber blooming. In addition, it was noted that panels which were prepared using polymer-modified cellulose fibers had harder and smoother surfaces and were more transparent than panels which used untreated cellulose fibers as the filler or reinforcement material.

*Example 17*

A series of experiments were carried out in which mixtures of glass fibers with poly(methylmethacrylate) modified wood pulp (the same type as used in Example 14) were used to reinforce polyester molding compositions.

In the first experiment, a control panel was prepared by incorporating 32% wt. of reinforcing material in IC–312 polyester resin containing a small amount of benzoyl peroxide catalyst. Panels were prepared as in Example 14 and were evaluated for various physical properties. IC–312 polyester resin is a commercial molding resin consisting of 70% polyester and 30% styrene, having a viscosity of 2,000–2,400 cps. The control panel which was prepared had a tensile strength of about 7,700 p.s.i. Izod impact strength of 7 ft. lbs./in. and water absorption in twenty-four hours of 0.80%.

In another experiment, a composition was prepared by incorporating 29% wt. of reinforcing material in IC–312 polyester resin containing benzoyl peroxide catalyst. The reinforcing material consisted of 80 parts by weight of glass fibers and 20 parts by weight of cellulose having a 63% addon of poly(methylmethacrylate), prepared as in Example 14. The reinforcing material was incorporated into the polyester resin and molded into flat panels as described above and various physical properties measured. The panel had a tensile strength of about 7,600 p.s.i., Izod impact strength of 11 ft. lbs./in., and water absorption in twenty-four hours of about 0.60%.

Several additional experiments were carried out in which compositions were prepared using reinforcing mixtures containing from 80–95 parts by weight of glass fiber and 5–20 parts by weight of cellulose having addons of 20–90% wt. poly(methylmethacrylate) prepared as in Example 14. The reinforcing compositions containing various amounts of poly(methylmethacrylate) were added to IC–312 polyester resin in proportions ranging from about 17–32%. Panels were prepared from these compositions and various physical properties measured. In each case, the tensile strength was equal to or superior to control panels, the impact strength was equal or superior to control panels, and the water absorption was only about 60% of that observed for the control panels.

Additional experiments were carried out in which the control panels and the panels containing poly(methylmethacrylate) modified cellulose were subjected to accelerated weathering tests over a period of 500–2,000 hours. At the end of this test, the control panels showed considerable evidence of blooming and other adverse weathering effects. The panels containing polymer-modified cellulose in every case showed substantially no blooming of cellulose fibers or of glass fibers and showed resistance to weathering substantially greater than that observed for the control panels.

Additional tests were carried out in which fiber reinforced panels were immersed in water for periods up to about eight weeks and also exposed to steam for extended periods of time. In each case, the laminates containing untreated cellulose fibers exhibited moderate to heavy cellulose fiber blooming while the panels containing polymer-modified cellulose fibers exhibited little or no cellulose fiber blooming. In addition, it was noted that panels which were prepared using polymer-modified cellulose fibers had harder and smoother surfaces and were more transparent than panels which used untreated cellulose fibers as the filler or reinforcement material.

*Example 18*

A chromium-plated matched die is prepared having a corrugated configuration and used to mold corrugated reinforced plastic panels for use in roofs, awnings, shelters, and the like. Corrugated roofing panels are prepared using a reinforcement consisting of 80 parts by weight of fiber glass and 20 parts by weight of cellulose fibers containing 63% deposited poly(methylmethacrylate), prepared in accordance with Example 14. The reinforcing composition is added in the proportion of about 30% to Lucite acrylic molding sirup and panels are prepared therefrom using the corrugated die, following the procedure described in Examples 15 and 16. The corrugated panels which are prepared are exceptionally weather resistant and have high impact and tensile strengths for use as roofs for patios, doorway shelter roofs, and the like.

*Example 19*

Chromium-plated matched dies are prepared having the configuration of seats and backs for outdoor furniture. These dies are used in the preparation of chairs for outdoor use. A reinforcing composition is prepared from 80 parts by weight of glass fibers and 20 parts by weight of cellulose fibers containing 63% addon of deposited poly (methylmethacrylate). This reinforcing composition is used in the proportion of approximately 30% by weight with IC–312 polyester resin. The resin and reinforcing fibers are molded in the matched dies, and seats and backs are prepared which are subsequently assembled for outdoor use. The chairs which are thus produced show exceptional resistance to weathering and have high impact and tensile strengths.

While the foregoing examples have been described with special emphasis upon the use of certain glass fiber and polymer-modified cellulose reinforcing fibers in reinforced plastic compositions, it should be understood that the process and compositions described above contemplate the use of other fibers, other polymers for modification of the fibers, and other plastic matrices to be reinforced by the polymer-modified fibers. I, therefore, wish to be understood that, within the scope of the appended claims, this invention may be practiced otherwise than as specifically described herein.

What is claimed is:

1. A shaped plastic article of manufacture consisting essentially of a mixture of a thermally moldable plastic matrix and a filler or reinforcement material, said filler or reinforcement material having a polymer of an olefinically unsaturated monomer previously deposited in and at least partially graft polymerized in situ thereto.

2. A shaped plastic article of manufacture according to claim 1 in which the plastic matrix is thermosetting.

3. A shaped plastic article of manufacture according to claim 1 in which the plastic matrix is thermoplastic.

4. A shaped plastic article of manufacture according to claim 1 in which the filler or reinforcement material is particulate.

5. A shaped plastic article of manufacture according to claim 1 in which the filler or reinforcement material is fibrous.

6. A shaped plastic article of manufacture according to claim 1 which is formed by compression molding.

7. A shaped plastic article of manufacture according to claim 1 which is formed by injection molding.

8. A shaped plastic article of manufacture according to claim 1 which is formed by extrusion.

9. A shaped plastic article of manufacture according to claim 1 which is formed by transfer molding.

10. A shaped plastic article of manufacture according to claim 1 which is formed by casting.

11. A shaped plastic article of manufacture according to claim 1 in which the filler or reinforcement material comprises cellulosic fibers having deposited therein a polymer of an olefinically unsaturated monomer.

12. A shaped plastic article of manufacture according to claim 1 in which the filler or reinforcement material comprises fibrous inorganic material having deposited therein a polymer of an olefinically unsaturated monomer.

13. A shaped plastic article of manufacture according to claim 1 in which the filler or reinforcement material comprises a cellulosic powder having deposited therein a polymer of an olefinically unsaturated monomer.

14. A shaped plastic article of manufacture according the claim 1 in which the filler or reinforcement material comprises an inorganic powder having deposited therein a polymer of an olefinically unsaturated monomer.

15. A shaped plastic article of manufacture according to claim 1 in which the filler or reinforcement material is prepared by chemically fixing a catalyst therein and contacting the material with an olefinically unsaturated monomer and anything additional required to render the chemically fixed catalyst material catalytically active.

16. A shaped plastic article of manufacture according to claim 11 in which the filler or reinforcement material is prepared by chemically fixing a catalyst therein and contacting the material with an olefinically unsaturated monomer and anything additional required to render the chemically fixed catalyst material catalytically active.

17. A shaped plastic article of manufacture according to claim 16 in which the olefinically unsaturated monomer is a vinyl monomer.

18. A shaped plastic article of manufacture according to claim 15 in which the olefinically unsaturated monomer is an acrylic monomer.

19. A shaped plastic article of manufacture which comprises a plastic matrix containing 15–40% by weight of a reinforcement material comprising about 80–95 parts by weight of glass fibers and 15–20 parts by weight of fibrous cellulosic material having a polymer of an olefinically unsaturated monomer deposited therein by chemically fixing a catalyst in the fibrous cellulosic material and contacting the material with an olefinically unsaturated monomer and anything additional required to render the chemically fixed catalyst material catalytically active.

20. A shaped plastic article of manufacture according to claim 19 in which the catalyst is fixed by ion exchange reaction with the cellulosic material.

21. A shaped plastic article of manufacture according to claim 20 in which the catalyst fixed by ion exchange reaction is part of a redox catalyst system and the remainder of the catalyst is added while the cellulosic material is contacted with the monomer.

References Cited by the Examiner

UNITED STATES PATENTS

| | | | |
|---|---|---|---|
| 2,470,329 | 5/1949 | Barkhuff | 260—17.4 |
| 2,601,597 | 6/1952 | Baniel et al. | 260—9 |
| 2,632,744 | 3/1953 | Howald | 260—17.4 |
| 2,841,566 | 7/1958 | Grotenhuis | 260—41 |
| 3,831,118 | 3/1963 | Bridgeford | 117—38 |

FOREIGN PATENTS

| | | |
|---|---|---|
| 345,197 | 3/1931 | Great Britain. |
| 598,378 | 2/1948 | Great Britain. |

WILLIAM H. SHORT, *Primary Examiner.*

E. M. WOODBERRY, *Assistant Examiner.*